United States Patent [19]

Miyamoto

[11] Patent Number: 4,776,545

[45] Date of Patent: Oct. 11, 1988

[54] BENCH STAND

[75] Inventor: Kouichi Miyamoto, Hiroshima, Japan

[73] Assignee: Ryobi Ltd., Hiroshima, Japan

[21] Appl. No.: 81,761

[22] Filed: Aug. 5, 1987

[30] Foreign Application Priority Data

Aug. 5, 1986 [JP] Japan .......................... 61-120515[U]
Aug. 5, 1986 [JP] Japan .......................... 61-120516[U]

[51] Int. Cl.$^4$ .......................................... F16M 11/38

[52] U.S. Cl. .................................. 248/558; 248/166; 248/172; 182/153

[58] Field of Search ............ 248/558, 670, 676, 163.1, 248/165, 166, 172, 173, 440.1, 677, 188.5, 188.8, 188.9; 108/116; 182/153, 181–186; 403/85, 109

[56] References Cited

U.S. PATENT DOCUMENTS

| | | | |
|---|---|---|---|
| 314,986 | 4/1885 | Aenis | 248/166 |
| 1,159,299 | 11/1915 | Van Huzer | 248/166 |
| 1,303,416 | 5/1919 | Tidyman | 182/184 |
| 1,614,818 | 1/1927 | Basford | 248/166 |
| 1,637,705 | 8/1927 | Newman | 248/166 |
| 1,749,706 | 3/1930 | Kingston | 182/184 |
| 2,706,661 | 4/1955 | Clayton | 182/186 |
| 2,823,078 | 2/1958 | Keema | 182/184 |
| 3,887,036 | 6/1975 | Telban | 182/186 |

FOREIGN PATENT DOCUMENTS 58-24720 5/1983 Japan .

*Primary Examiner*—Alvin C. Chin-Shue
*Assistant Examiner*—Robert A. Olson
*Attorney, Agent, or Firm*—Sughrue, Mion, Zinn, Macpeak, and Seas

[57] ABSTRACT

A bench stand in which two bisymmetric stand are coupled together by a pair of cross-linked flat bars. Their bottom ends are bolted to the legs of the stands. Their top ends can be bolted to any of a series of bolt holes in the legs. The middles of the flat bars are screwed together at a series of positions corresponding to the bolt holes on the legs. Thereby, the width of the bench stand can be varied. Additionally, height adjustable auxiliary legs are attached to the bottom of the main legs. Parallel slits inclined to the axes of the legs are formed in the auxiliary leg are a bolt through one of the slits is tightened to the main legs.

5 Claims, 6 Drawing Sheets

BENCH STAND

BACKGROUND OF THE INVENTION

1. Field of the Invention

The present invention relates to a bench stand suitable for use in which a motor-operated tool cuts and grinds workpieces and bores holes through the workpieces.

2. Background of the Invention

Heretofore, there has been developed a bench stand leg adjusting apparatus of the sort disclosed in Japanese Utility Model Publication No. 24720/83.

Although the above bench stand leg adjusting apparatus is effective in that the bench stand can be moved up and down within a fixed range, it is complicated in construction. Also, because the width of the bench plates is not adjustable, the number of tool models fittable thereto is limited.

SUMMARY OF THE INVENTION

The present invention is intended to solve the aforesaid problem. Therefore, an object of the invention is to provide a bench stand built so that an adjustment can be made to freely set bench plates apart or close to each other with an extremely simple arrangement in order that work thereon is facilitated. Further, by selecting a plurality of setting holes bored in the bench plates, different kinds of machines can be fitted thereto.

It is another object of the present invention to provide a bench stand height adjusting apparatus arranged so that its height is adjustable with a simple operation of only fitting and removing bolts and that the thus adjusted height can be securely maintained.

More specifically, a plurality of setting holes are bored in each flat bar in such a manner that a pair of flat bars are cross-linked bisymmetrically at multiple stages and are fixed with a screw. One end of each flat bar is respectively fixed to bisymmetric stands with bolts. A plurality of setting holes are respectively bored in each of the bisymmetric stands at proper intervals in the long direction so that the other end of each flat bar is selectively fixed thereto with bolts. The aforesaid problem as to the width of the bench plates is thus solved.

With respect to the adjustment of the height of the bench stand, on the other hand, an auxiliary stand is vertically and slidably fitted into the lower end of each of the bisymmetric stands each fitted with the bench plates at their upper end. A plurality of height adjusting slits are vertically aligned at an inclination angle to the direction in which the sliding force of each slit acts. Further, a tap bolt is screwed into the corresponding slit and tightened to solve this problem.

DETAILED DESCRIPTION OF THE INVENTION

Figure 1:
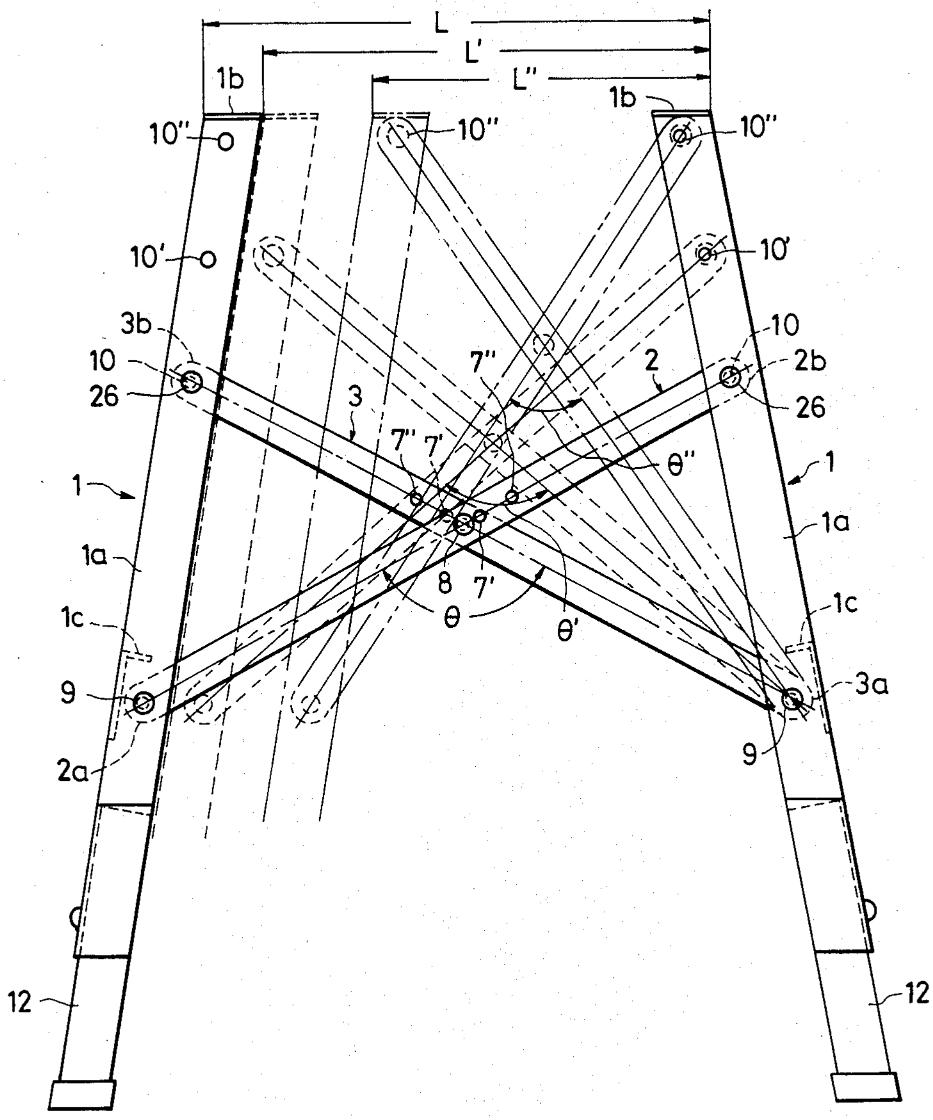
FIG. 1 is an elevational view of a bench stand embodying the present invention.
Figure 2:
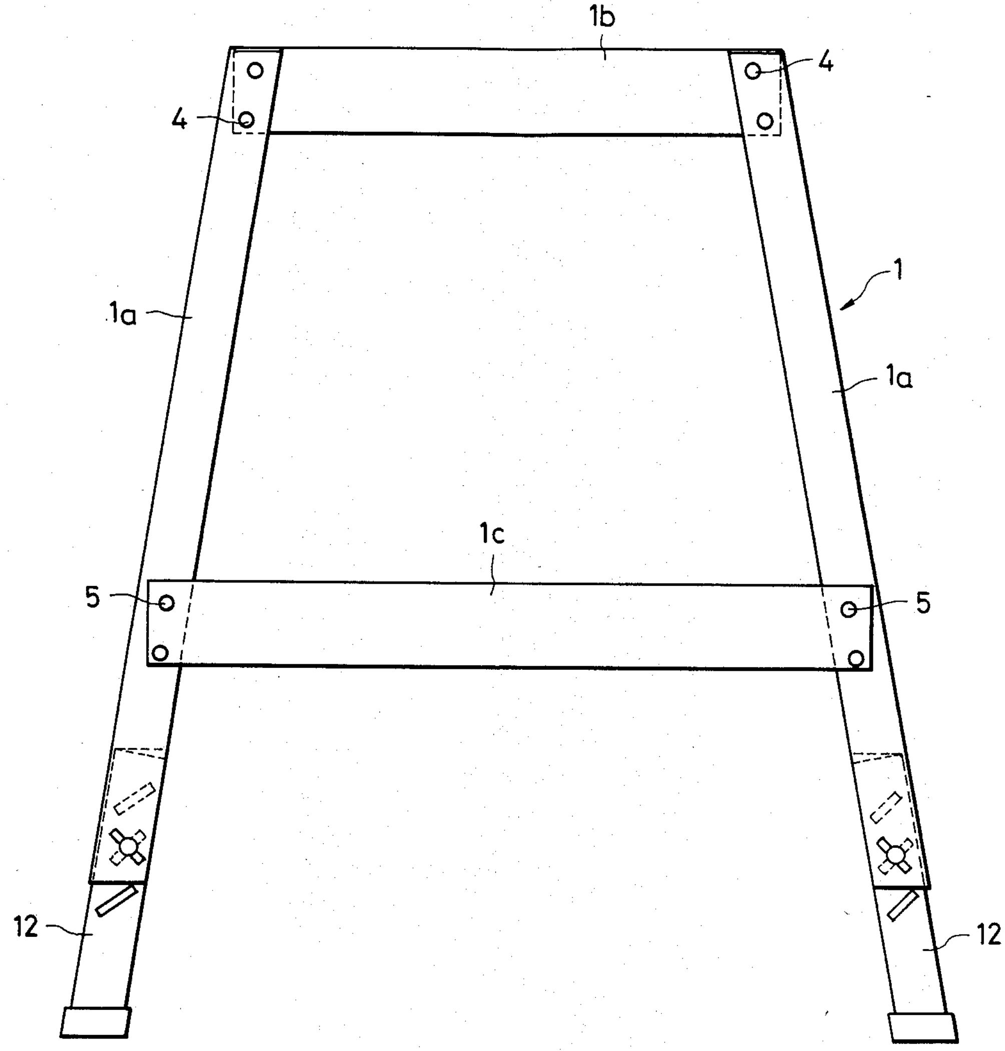
FIG. 2 is a side view of the embodiment of FIG. 1.
Figure 3:
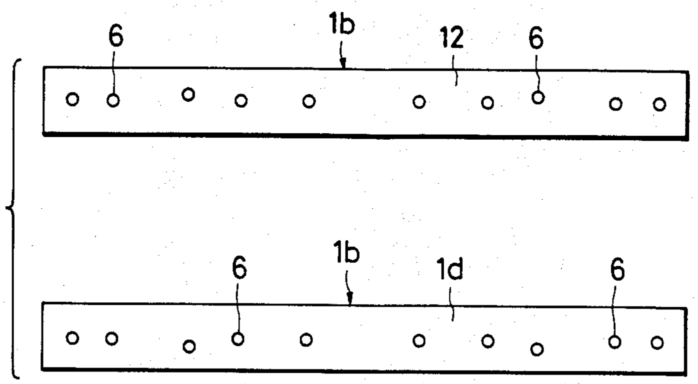
FIG. 3 is a top view of bench plates embodying the present invention.

Referring now to the accompanying drawings, an embodiment of the present invention will be described in detail. As shown in FIGS. 1 and 2, a bench stand according to the present invention is composed of bisymmetrical stands 1 and two pieces of flat crossbars 2 and 3. More specifically, the bisymmetrical stand each comprise two legs 1*a*, a horizontally-mounted bench plate 1*b* fixed with bolts 4 to the upper ends of the both legs 1*a* and a horizontally-mounted angle bar 1*c*, fixed with bolts 5 to the intermediate portions of the legs 1*a*. These parts constitute a substantially trapezoidal frame as viewed from the side. As shown in FIG. 3, further, a plurality of setting holes 6 are bored at proper intervals in the long direction in each of the bench plates 1*b* for use in bolting a machine such as a motor-operated tool.

Figure 4:
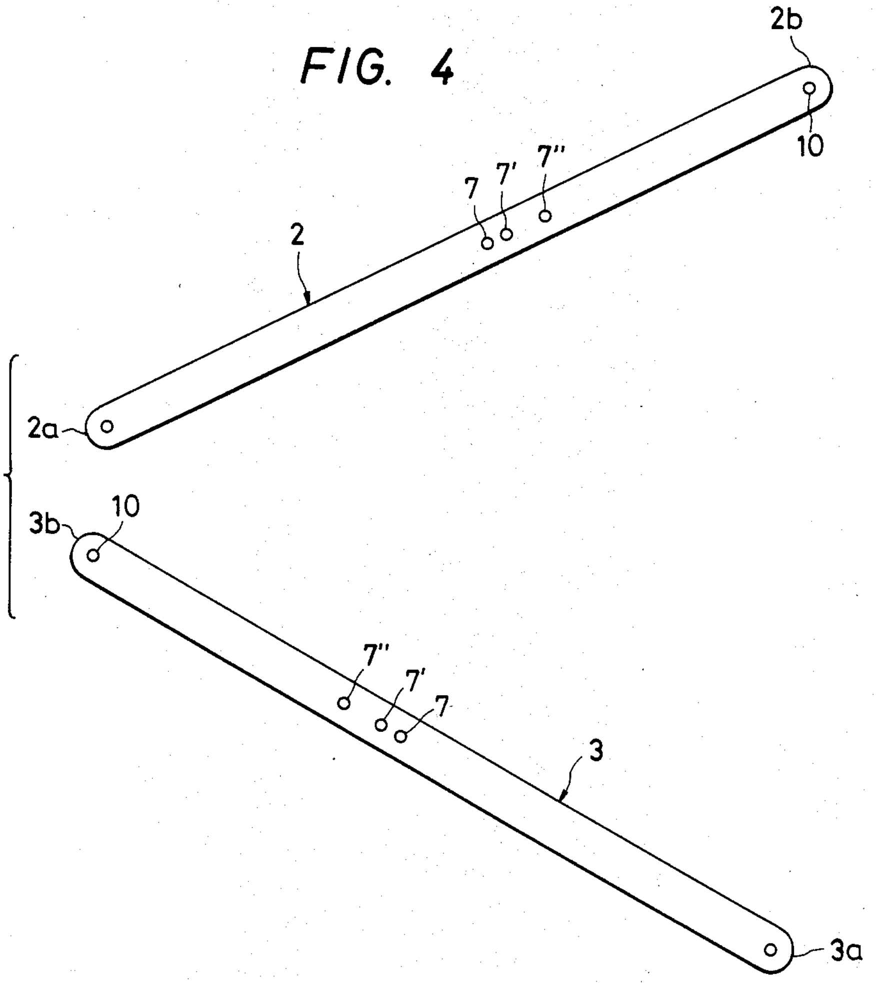
FIG. 4 is an elevational view of flat bars embodying the present invention.

The two crossbars 2 and 3 having the same length are shaped like a belt and, as shown in FIG. 4, three setting holes 7, 7′ and 7″ are bored at proper intervals in the long direction of each crossbar 2 and 3 so that two of them are cross-linked bisymmetrically substantially in the form of an X at multiple stages. The setting holes 7, 7′ and 7″ are selected in corresponding pairs and fixed together with a screw to change an angle $\theta$, $\theta'$ or $\theta''$ between the two crossbars 2 and 3. On the other hand, ends 2*a* and 3*a* of the crossbars 2 and 3 are respectively fixed with bolts 9 to lower portions of the corresponding legs 1*a* of the bisymmetrical stands 1.

Moreover, upper ends 2*b* and 3*b* of the crossbars 2 and 3 are each fixed with bolts 11 to selected ones of a plurality of setting holes 10, 10′ and 10″ bores at proper intervals in the long direction of the legs 1*a*.

In this case, the setting holes 7, 7′ and 7″ of the crossbars 2 and 3 and the setting holes 10, 10′ and 10′ of the legs 1*a* are prepositioned so as to allow for three arrangements. In the first arrangement the upper ends 2and 3*b* of both the crossbars 2 and 3 are bolted to the setting holes 10 in such a state that the crossbars 2 and 3 are cross-linked with the screw 8 inserted through the setting holes 7. In the second arrangement the crossbars 2 and 3 are bolted to the setting holes 10′ and to each other at the setting holes 7′. In the third arrangement, the crossbars 2 and 3 are bolted to the setting holes 10″ and to each other at the setting holes 7″.

As shown in FIGS. 1 and 2, two height adjusting auxiliary legs 12 are provided at the lower end of each of the bisymmetrical stands 1.

With the aforesaid first arrangement, the upper ends 2*b* and 3*b* of the flat bars 2 and 3 are fixed with the bolts 11 to the lowermost setting holes 10 while the crossbars 2 and 3 are fixed with the screw 8 to the setting holes 7. In this state, the width across the bench plates 1*b* at the upper ends of the stands 1 is held at a maximum separation L.

When the crossbar 2 and 3 are fixed with the screw at the setting holes 7′ with the uppers ends 2*b* and 3*b* fixed with the bolts to the middle setting holes 10′ of the stands 1, the space between the bisymmetrical stands 1 is narrowed to a separation L′. When the crossbars 2 and 3 are fixed with the screw 8 at the setting holes 7″ with the upper ends 2*b* and 3*b* fixed with the bolts to the upper setting holes 10″ of the stands 1, the space therebetween is further narrowed to a separation L''. Consequently, the space between the bench plates 1*b* can be adjusted at multiple stages L, L' and L'' as shown in FIG. 1.

Referring to the drawings, a height adjusting mechanism embodying the present invention will subsequently be described. As shown in FIGS. 5 through 8, the ends of two crossbars 3 and 4 cross-linked bisymmetrically with a screw substantially 8 in the form of an X are fixed with bolts 25 and 26 to the legs 1*a* of the two stands.

Moreover, the bisymmetrical stands 1 include the two legs 1*a*. Horizontally mounted bench plates 1*b* are fixed with bolts 27 to the upper ends of the legs. Horizontally mounted angle bars 1*c* are fixed with bolts 28 to lower portions of the legs 1*a*. The combination of the those parts form a substantially trapezoidal frame stably held upright.

Channel steel or the like is employed for the legs 1a of the stands 1. At the lower ends of the stands 1, height adjusting auxiliary legs 12 are vertically and slidably fitted in the legs 1*a*.

Figure 5:
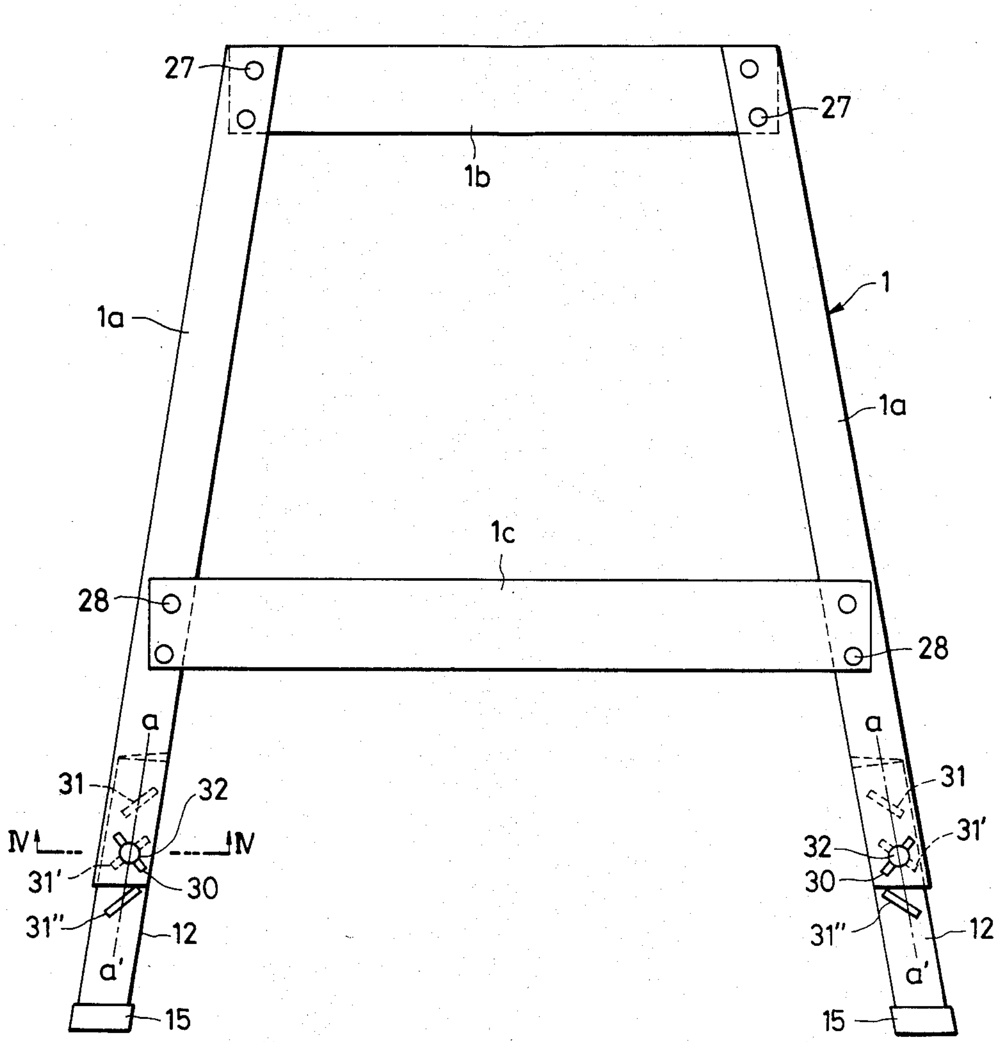
FIG. 5 is an elevational view of a bench stand height adjusting apparatus embodying the present invention.
Figure 8A:
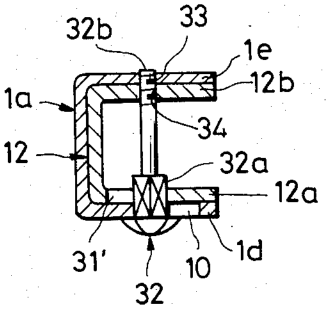
FIGS. 8A and 8B are englarged transverse sectional views taken on line IV—IV of FIG. 5.

A slit 30 is formed in side wall 1*d* in each leg 1*a* and is inclined at an angle $\alpha$ to the axis a—a' of the leg 1a and auxiliary leg 12. Slits 31, 31' and 31'' are formed in the one side wall 12*a* of the height adjusting auxiliary legs 12 and are vertically aligned at an angle of inclination $\beta$ opposite to $\alpha$ in the direction a—a'. The side wall 12*a* of the auxiliary leg 12 is internally in contact with the side wall 1*d* of the main leg 1*a*. As shown in FIGS. 5 and 8A, a tap bolt 32 having a tap portion 32*a* is closely fit for the widths b and c of the slits 30 and 31—31''. The tap bolt 32 is fitted in the corresponding slits 30 and 31'. A screw portion 32*b* of the tap bolt 32 put opposite to the slits 30 and 31' is forced in screw holes 33 and 34 provided in conformity with the other side wall 1*e* of the main leg 1*a* and a side wall 12*b* of the auxiliary leg 12. Thereby the stand 21 and the auxiliary leg 12 are tightened.

Figure 8B:
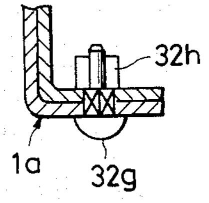

More specifically, the contact face of the stand 1 and the auxiliary legs 12 and the tap portion 32*a* of the tap bolt 32 is inclined opposite to the direction a—a in which the sliding force acts and, by tightening the bolt 32, the sliding force of the main legs 1*a* and the auxiliary legs 12 is strengthened. Alternatively, the stand 21 and the auxiliary leg 12 are tightened by a bolt 32*g* and a nut 32*h* as shown in FIG. 8B.

As illustrated, one slit 30 is provided in each stand 1 and three slits 31, 31' and 31'' are provided at the fixed intervals in the sliding direction of the auxiliary leg 12. On the contrary, however, a plurality of slits 30 and one slit 31 may be provided in the stand 1 and the auxiliary leg 12, respectively. Moreover, both of them may have a plurality of such slits.

The main legs 1*a* and the auxiliary legs 12 need not necessarily be made of channel steel but may be formed with cylindrical or any polygonal pipes.

Figure 6:
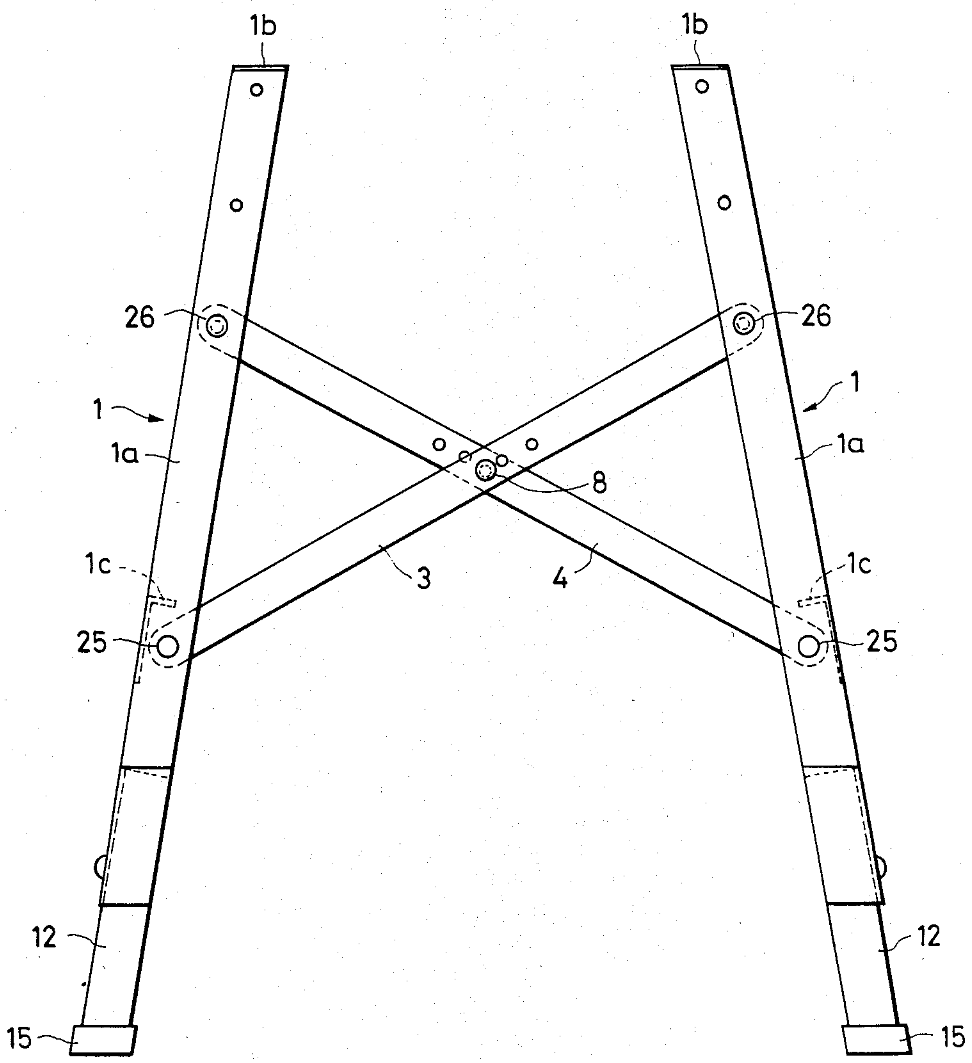
FIG. 6 is an elevational view of the embodiment of FIG. 5.
Figure 7:
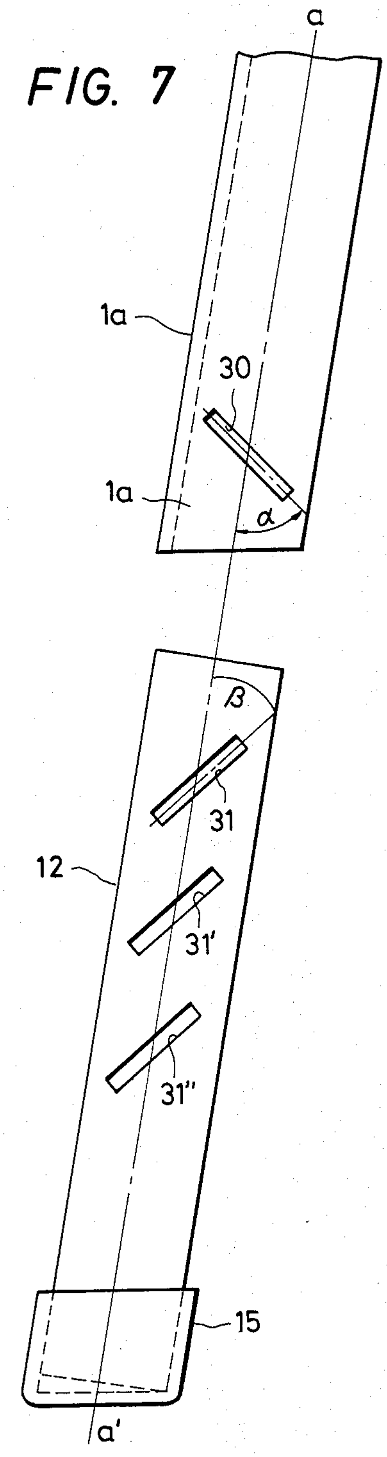
FIG. 7 is an enlarged exploded view of the principal part of the embodiment of FIG. 5.

The aforesaid slits 30 and 31—31'' are vertically aligned at opposite angles $\alpha$ and $\beta$ of 45° of inclination with respect to the direction of a—a' in which the mutual sliding force of the stands 1 and the auxiliary legs 12 act but the angles of inclination $\alpha$ and $\beta$ may be set at any given angle other than what has been thus illustrated. However, the slits 30 and 31—31'' should be opposite in direction and formed at the same angle of inclination. In FIGS. 5 and 6 stand caps 35 are attached to lower ends of the auxiliary legs 12.

As set forth above, the bench stand according to the present invention is arranged so that the space L between the bisymmetrical bench plates 1*b* can be set wide or narrow. That is, the bisymmetrical space therebetween can be made adjustable at multiple stages depending on the intended use by selecting the setting holes 7, 7' and 7'' bored in the two crossbars 23 and 3 holding the bisymmetrical stands 1 to fix them together with the screw 8 and by fixing the upper ends 2*b* and 3*b* of the crossbars 2 and 3 with the bolts 26 to the corresponding setting hole 10, 10' or 10'' provided in the bisymmetrical stands 1. Thereby, not only is the workability improved but any one of multiple machine models can be installed by selecting one of the setting holes 6 bored in the bench plates 1*b*. In addition, the advantages of the present invention include an increase in the range of use, reduced production cost attributed to its extreme simplicity in construction, and ease of operation because the bench plate 1*b* can be adjusted in width simply and quickly by any one capable of attaching and detaching the screw 8 and the bolt 11.

On the other hand, since the bench stand height adjusting apparatus is so arranged as to allow the operator to adjust the height of the bench stand to what he considers most suitable depending on the machine model being set on the bench plates 21b and according to the purpose of work by simply attaching or detaching the bolts 32 to or from the plurality of slits 30 and 31—31'' provided in the stand 1 and the auxiliary legs 12 in order to accomplish the intended operation. Moreover, since the plurality of slits 30, 31—31'' are vertically aligned in the stand 1 and the auxiliary legs 12 at an angle of inclination to the direction a—a' in which the mutual sliding force of them acts with the tap bolts 32 fitted into the slits and tightened, the sliding force of the stands 1 and the auxiliary legs 12 is strenghened. The stands 1 and the auxiliary legs 12 are thus prevented from sliding against the weight acting on the bench stand itself to ensure that the height adjustment is maintained. Further, only the tilted slots 30 and 31—31'' with the tap bolts 32 are vertically provided in the stands 1 and the auxiliary legs 12, whereby extreme simplicity in construction contributes to an inexpensive process of manufacture.

What is claimed is:

1. A bench stand, comprising:

two stands each comprising two coupled main legs, at least one of said legs including a plurality of setting holes correspondingly positioned in said two stands; and two bars each including at one end a first bolting hole fixable with screw means to any of said setting holes, including at another end a second bolting hole fixed to respective ones of said legs, and including a plurality of pivoting holes couplable with a screw between corresponding pivoting holes on said two bars.

2. A bench stand as recited in claim 1, wherein each of said stands further comprises a lower plate affixed to lower ends of each of said legs of said each stand and an upper plate affixed to upper ends of said legs of said each stand and including a plurality of tool mounting holes.

3. A bench stand as recited in claim 1, further comprising:

auxiliary leg members fitted into lower ends of each of said legs and slidable along respective sliding directions and wherein a plurality of parallel slits inclined to respective ones of said sliding directions are formed in respective first ones of said legs and said auxiliary leg members; and tightenable screw means fittable into said slits and fixing respective pairs of said legs and said auxiliary leg members.

4. A bench stand as recited in claim 3, further comprising additional slits formed in second ones of said legs and said auxiliary leg members, inclined to respective ones of said sliding directions and nonparallel to respective sets of said parallel slits and fittable with said screw means.

5. A bench stand as recited in claim 4, wherein said parallel slits and said additional slits are formed at equal but opposite angles to respective ones of said sliding directions.

* * * * *